United States Patent [19]
Eis et al.

[11] Patent Number: 5,832,705
[45] Date of Patent: Nov. 10, 1998

[54] AGRICULTURAL MACHINE

[75] Inventors: Günter Eis, Harsenwinkel; Ferdinand Weitenberg, Ennigerloh; Raulf Bussmann, Sassenberg; Dominik Bürmann, Verl, all of Germany

[73] Assignee: Claas KGaA, Harsewinkel, Germany

[21] Appl. No.: 722,790

[22] Filed: Sep. 27, 1996

[30] Foreign Application Priority Data

Sep. 29, 1995 [DE] Germany ............ 195 36 344.2

[51] Int. Cl.⁶ .................................. A01B 71/00
[52] U.S. Cl. ................. 56/14.9; 56/15.6; 56/228; 56/DIG. 9
[58] Field of Search ............... 56/14.9, 15.1, 56/15.2, 15.6, DIG. 9, DIG. 11, DIG. 14, 228; 37/468

[56] References Cited

U.S. PATENT DOCUMENTS

| | | | |
|---|---|---|---|
| 2,469,622 | 5/1949 | Acton | 56/DIG. 11 X |
| 4,046,399 | 9/1977 | Zeuner et al. | 56/15.6 X |
| 4,253,295 | 3/1981 | Knepper | 56/15.6 |
| 4,280,317 | 7/1981 | Lindblom et al. | 56/15.6 |
| 5,133,174 | 7/1992 | Parsons | 56/DIG. 11 X |
| 5,136,828 | 8/1992 | Ermacora | 56/14.9 X |
| 5,146,737 | 9/1992 | Gantzer | 56/14.9 |
| 5,333,400 | 8/1994 | Sonerud | 37/468 |
| 5,511,368 | 4/1996 | Kocher | 56/DIG. 14 X |

FOREIGN PATENT DOCUMENTS

| | | | |
|---|---|---|---|
| 2676765 | 11/1992 | France | 37/468 |
| 511890 | 6/1976 | U.S.S.R. | 56/14.9 |

Primary Examiner—John A. Ricci
Attorney, Agent, or Firm—Michael J. STriker

[57] ABSTRACT

An agricultural machine has a main machine, an additional device coupled with the main machine, a hydraulic unit performing control or working functions and including hydraulic valves and hydraulic supply and return conduits, a control current unit for controlling the hydraulic valves and provided with electrical conductors, plug means conductively connecting the hydraulic conduits and the electrical conductors in a region of a separating point between the additional device and the main machine, the plug means including a plug and a plug socket, and a two-part coupling unit formed so that in a region of separating point the plug and the plug socket, the hydraulic supply and return conduits and the electrical control conductors are installed in the coupling unit in positions corresponding to one another, the coupling unit including one coupling half associated with the main machine and another coupling half associated with the additional device.

14 Claims, 5 Drawing Sheets

AGRICULTURAL MACHINE

BACKGROUND OF THE INVENTION

The present invention relates to an agricultural machine.

More particularly, it relates to an agricultural machine which includes a main machine, and an attachment or working device coupled to it. With the attachment and working device, the control and/or working functions are performed through a hydraulic circuit controllable by hydraulic valves. The hydraulic supply and return conduits as well as the electrical control conductors are connectable by coupling units formed as plug connectors in the region of the separation point between the attachment or working device and the main machine.

The agricultural machine of the type mentioned hereinabove is for example a self-propelling harvester thresher. The attachment in this case is for example a cutting mechanism provided with a reaper, a cutter bar, and a drawing-in screw, or a picking attachment for harvesting of corn. The attachment is coupled at the front side of the drawing-in passage for operation of the harvester. In a cutting mechanism, the reaper is driven hydraulically through a correspondingly designed drive. The reaper is lifted by a hydraulic cylinder-piston unit or when necessary adjusted in a traveling direction. Moreover, the cutting bar can be adjusted in the traveling direction. The corresponding drive or hydraulic cylinder-piston unit are controlled through hydraulic valves which are actuated mechanically or by an electromagnet. The cutting mechanism of a self-propelling harvester thresher must be frequently dismounted from the harvester thresher, and not only when it must be exchanged by another harvesting attachment, but also during transportation in open street traffic because of the excessive width. The number of the controlled hydraulic valves for the drive and control functions of a cutting mechanism depends on the required number of the hydraulic drives and/or hydraulic cylinder-piston units. The hydraulic and electrical conduits must be separated during dismounting of the attachment device in the region of the separating point between the inclined conveyer and the attachment device. For this purpose, the hydraulic or the electrical conduits between the harvester thresher and the cutting mechanism are connected through a coupling unit which is composed of a plug socket and a plug. Before the removal of the supply device or after the mounting of the supply device the plug can be inserted in the associated plug socket. This is time consuming and complicated for a machine driver, especially when a plug and the plug socket are arranged on different locations. A substantial disadvantage is also the fact that in the case of a plurality of the plug connections, a plug or a plug socket are easily dirtied and thereby cause disturbances and damages in the hydraulic or electrical system.

SUMMARY OF THE INVENTION

Accordingly, it is an object of present invention to provide an agricultural machine of the above mentioned general type, which avoids the disadvantages of the prior art.

More particularly, it is an object of present invention to provide an agricultural machine which is designed with a simple construction so that the coupling and uncoupling of an attachment device or a working device can be performed in the shortest possible time, the danger of dirtying is lowered, and the structural changes can be reduced to a minimum.

In keeping with these objects and with others which will become apparent hereinafter, one feature of the present invention resides, briefly stated in an agricultural machine, in which in the region of the separating point of the plug and the plug socket, the hydraulic supply and return conduits as well as the electrical control conduits are arranged in corresponding positions relative to one another in a two-part coupling device, wherein one coupling half is associated with the main machine and the other coupling half is associated with the attachment.

In accordance with another feature of the present invention, the rear wall of the attachment device facing the main machine has a throughgoing opening for at least one hydraulic supply and return conduit as well as an electrical control cable, whereas the hydraulic valves are mounted in form of a control unit adjacent to the throughgoing opening.

With the simply produced throughgoing opening in the rear wall of the attachment device, it is now possible to pass one or all hydraulic conduits as well as the control cable through the opening and conductively connect them with the hydraulic valves. From the control unit, the individual supply conduits and return conduits can lead to the hydraulic drives or cylinder-piston units. For separation of the hydraulic and electrical conduits in the region of the separating point, it is sufficient to separate both coupling halves from one another or connect them with one another. By mounting of the hydraulic valves in the immediate area of the throughgoing opening they are protected during the operation, visible by the machine driver, and in all cases accessible for maintenance or repair. Moreover, due to the reduction of the number of the plug connections and assembly of all plugs in one coupling device, the danger of dirtying is lowered.

In accordance with a further advantageous feature of the invention, the throughgoing opening is arranged near the connection aggregate of the main machine in the rear wall of the attachment device. In a harvester thresher the through going opening is arranged laterally near the inclined conveyer. It is advantageous to install the control unit formed from the hydraulic valves in the region on the attachment device which is associated with the throughgoing opening. Since for different attachment devices different functions are needed, this control unit can be arranged on the corresponding attachment device so that all possible functions can be used.

A structurally simple solution is provided when the coupling halves provided with plug sockets are cup-shaped and the coupling halves provided with the plugs are disk-shaped, and the disk is sealed from outside by a sealing body. The components which form the plugs and the plug sockets are firmly and releasably insertable in the corresponding openings. For simple mounting the coupling device on the rear wall of the attachment device, a console is provided to carry the hydraulic system and the electromagnetic valves and coupling devices. The valves are located inside the console which can be eventually opened at the rear, in a protected manner. The coupling half which receives the plug sockets is formed as a fixed part which is fixed on the console, for example by screws.

In especially advantageous manner, the coupling halves which receive the plugs are provided with connections for the hydraulic supply and return conduits and three plugs for electrical control conduits. The expenses are therefore very low since all hydraulic drives and cylinder-piston units are supplied from the control unit which also forms a distributor station.

For fixed connection of both coupling halves, the coupling half which receives the plug socket and is associated with the attachment device is provided with a central thread so that a hand nut is screwable on it for a fixed, releasable connection with the other coupling half. For accurate centering of the disk-shaped coupling half, it has a guiding pipe corresponding to the threaded pin and a centering pin engaging in an opening of the other coupling half.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
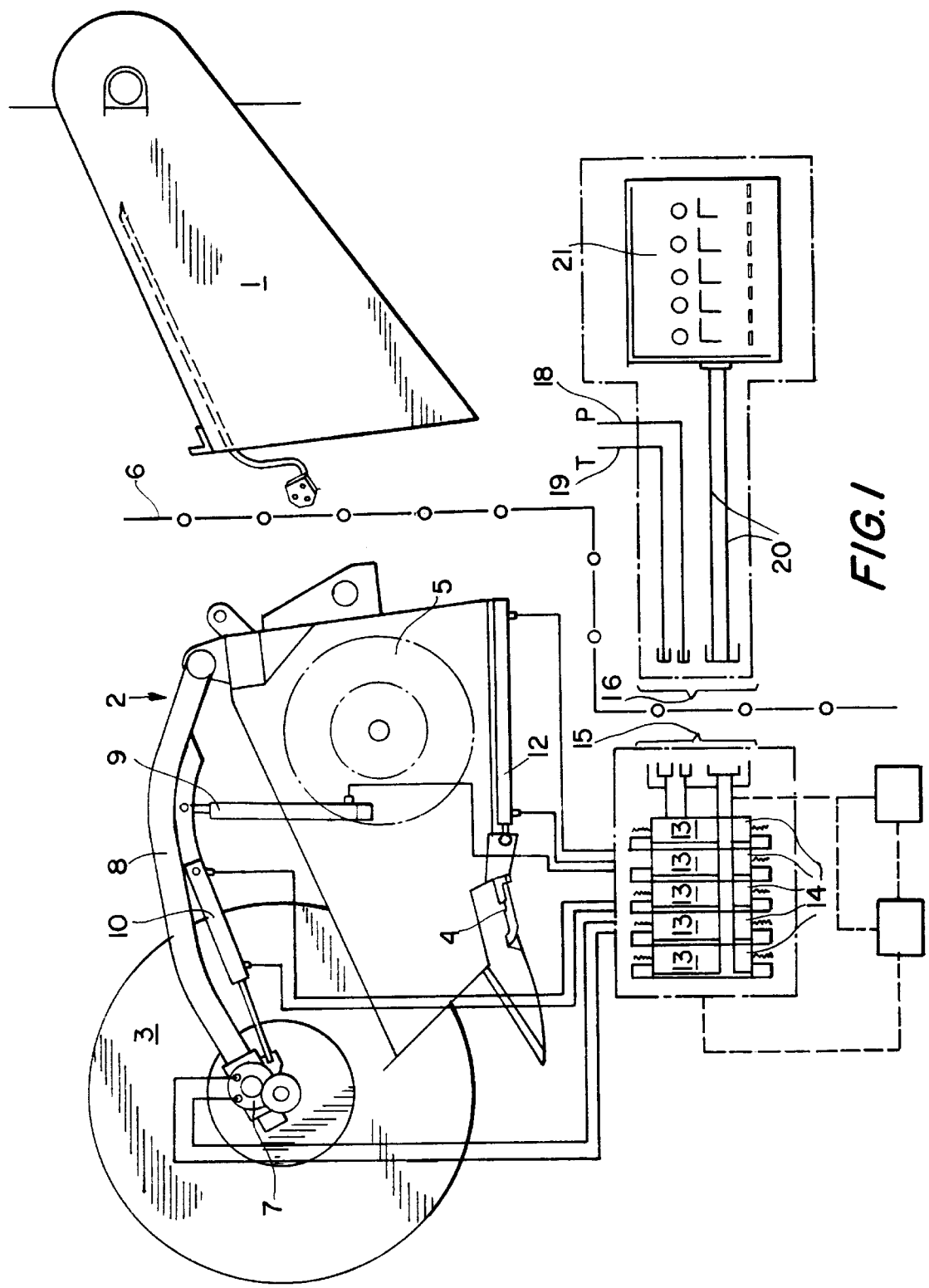
FIG. 1 is a partial view of an agricultural machine formed as a harvester thresher with an uncoupled cutting mechanism.

Self-propelling harvester thresher is shown partially on a side view in FIG. 1. It is provided with an inclined conveyer 1 for drawing-in of the harvested product. The inclined conveyer 1 is a fixed component of the main machine. An attachment device 2 formed as a cutting mechanism or a not shown picking device is coupled with the inclined conveyer 1. The attachment device 2 is provided with a rotatably driven reaper reel 3, a cutter bar 4 provided with a cutter, and a drawing-in screw 5. The separating point of the main machine from the attachment device 2 is identified with the line 6.

The reaper reel 3 is rotatably driven by a hydraulic drive motor 7. Furthermore, it is adjustable as to its height by a rocker 8 and a single-acting hydraulic cylinder-piston unit 9. A further, double-acting hydraulic cylinder-piston unit 10 horizontally adjusts the reaper reel 3 relative to the cutter bar 4. Moreover, the cutter bar 4 is adjustable by a double-acting hydraulic cylinder-piston unit 12 independently from the reaper reel 3 as to the distance. The hydraulic drive 7 and the hydraulic cylinder-piston units 9, 10 and 12 are controlled by magnetic valves, preferably in form of proportional valves 13. It is to be understood that instead of the proportional valves, also conventional black-and-white valves are suitable for realization of the inventive idea. The proportional valves 13 are mounted in a series to form a control unit. The outlets are connected through hose conduits with the hydraulic drive 7 as well as the hydraulic cylinder-piston units 9, 10 and 12 so as to provide corresponding flows. The control of the proportional valves 13 is performed by electromagnets 14 which form a unit with the proportional valves. As shown in FIG. 1, the control unit formed by the proportional valves 13 and the electromagnets 14 is associated with the attachment device 2.

The conductive connection in the region of the separating line 6 is performed by a coupling device 17 composed of two coupling halves 15 and 16. As can be seen from FIG. 1, the supply conduit 18 extending from the pump and the return conduit 19 leading to the tank are connected with the coupling half 16 associated with the main machine. Also, the electrical control conductors 20 are connected with the same coupling half 16. FIG. 1 also shows that the control of the electromagnet 14 is performed by a control panel 21 installed in a driver's cabin of the harvester. It can be seen that the control panel 21 together with the supply conduit 18, the return conduit 19, and the electrical control conductors 20 form a unit associated with the main machine.

Figure 2:
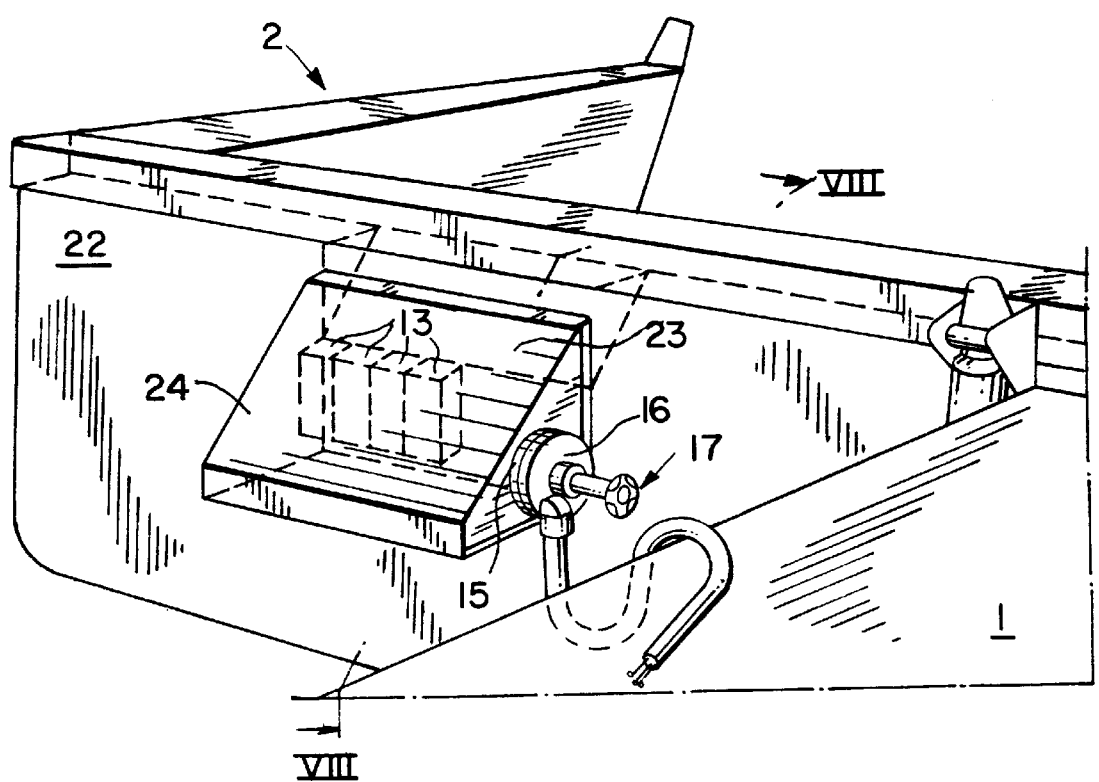
FIG. 2 is a partial rear view of the cutting mechanism in accordance with FIG. 1.

FIG. 2 shows partially a rear wall 22 of the attachment device. The rear wall 22 is provided near the inclined conveyer 1 with a throughgoing opening 23 for the hydraulic and electrical conductors. The throughgoing opening 23 is surrounded by a console 24 arranged on the rear wall 22 and mounted on the rear side which faces the main machine. The console 24 carries the proportional valves 13 as well as not shown electromagnet. The coupling half 15 and the coupling half 16 fixed on it are mounted outside on the side facing the inclined conveyer 1. The coupling half 15 carries the plug sockets for the supply conduit 18, for the return conduit 19, and for the electrical control conduits 20, and the coupling half 16 is provided with corresponding plugs. A cable which has all electrical control conductors 20 is connected with the coupling half 16.

Figure 3:
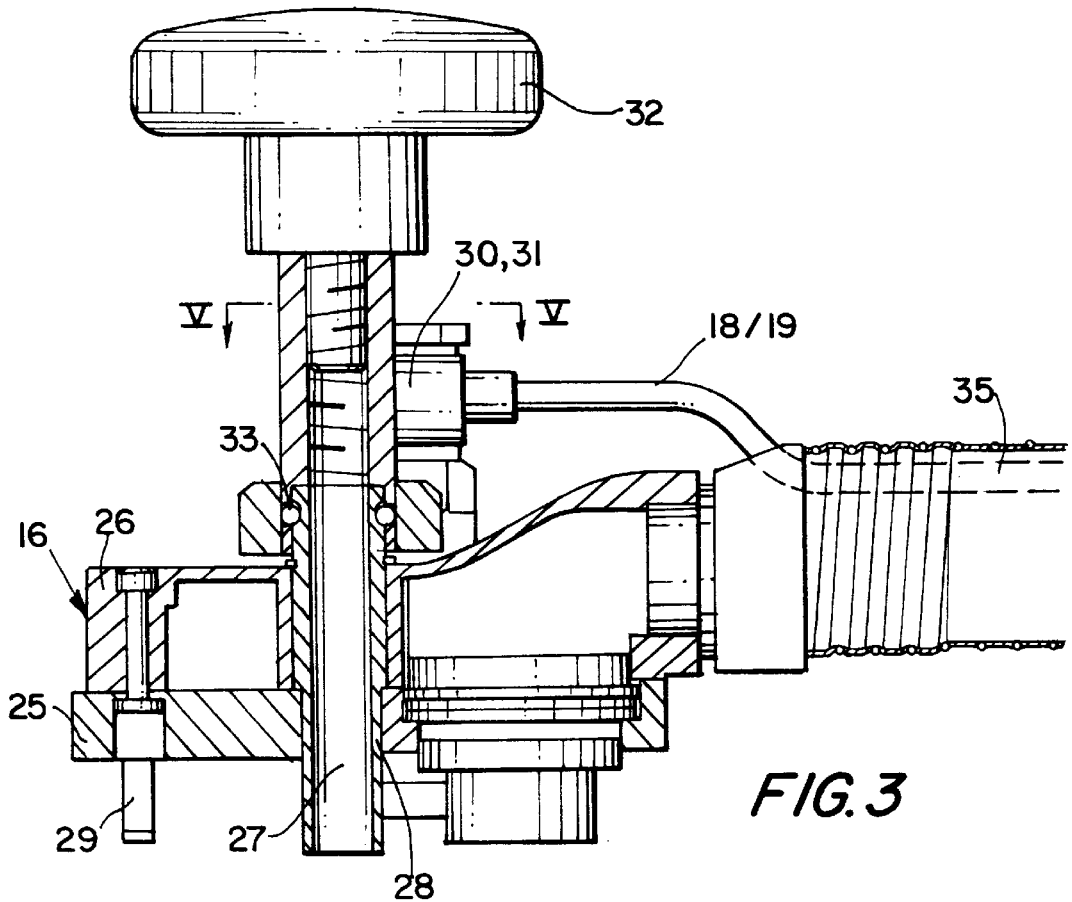
FIG. 3 is a view showing a coupling half which receives a plug, in a vertical section.

As shown in FIG. 3, the coupling half 16 is provided for receiving the plug for the hydraulic supply conduit 18, the return conduit 19 and for the electrical control conductors 20. For this purpose the coupling half 16 has a disk 25 provided with corresponding openings for receiving the plugs at the side facing away from the coupling half 15. The disk 25 is sealed by a sealing body 26. A threaded pin 27 extends into the coupling half 16 and is located inside a sleeve connected with the disk 25. The threaded pin 27 projects outwardly beyond the outer surface of the disk 25. Furthermore, the disk 25 is provided with a centering pin 29 which projects relative to the surface facing the coupling half 15 and engages in a corresponding opening. The supply conduits 18 and the return conduits 19 are associated with the coupling half 16. They are connected with the not shown plugs through connections 30 and 31.

Figure 4:
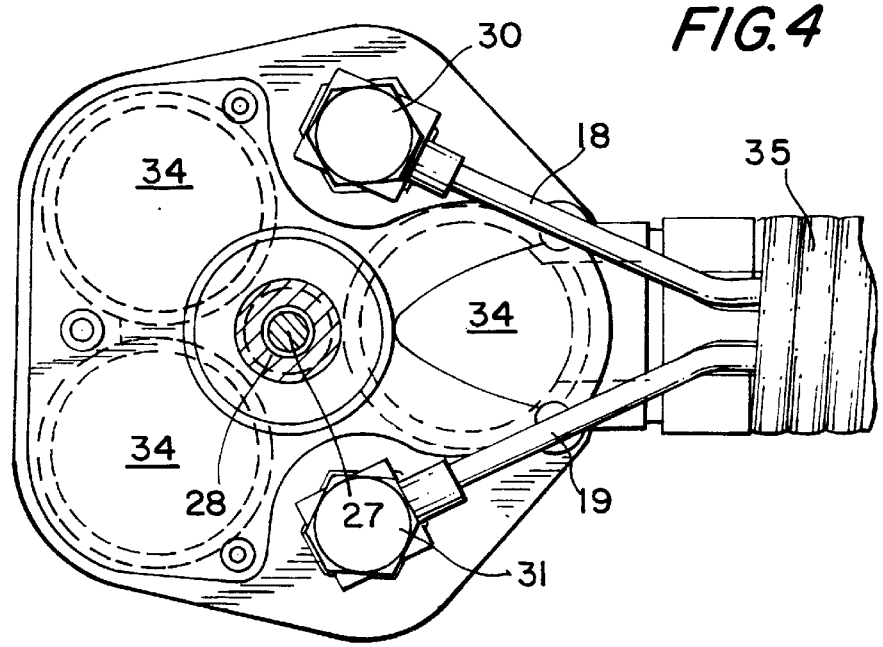
FIG. 4 is a view showing a coupling half of FIG. 3 as seen from line 5—5 in FIG. 3.

The connection of the both coupling halves 15 and 16 is performed by a hand nut 32 provided with an inner threaded sleeve 33 which is screwed on the threaded pin 27. The free end of the inner threaded sleeve 13 has an increased diameter and engages the free end of the sleeve 28. A round ring 23 is inserted in the connecting region. The plate 25 is provided with three openings 34 for receiving the electrical plugs. A corresponding control conductors are united in a cable 35. FIG. 4 shows a plan view of the plug shown in FIG. 3.

Figure 7:
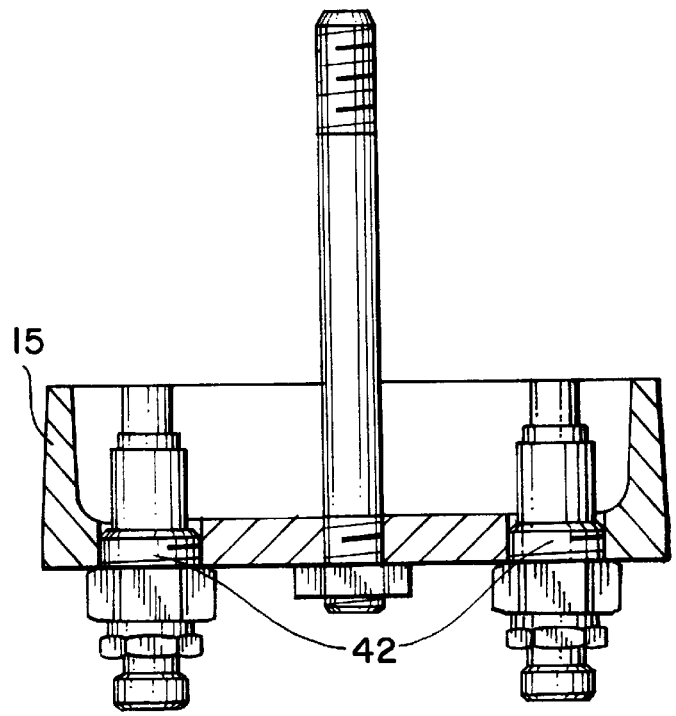
FIG. 7 is a view showing a section taken along the line 7—7 in FIG. 5.
Figure 6:
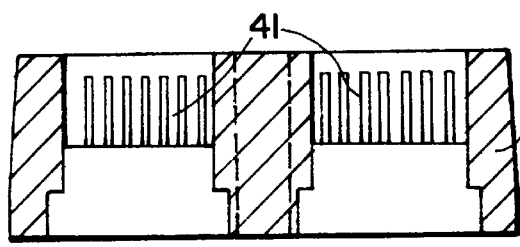
FIG. 6 is a view showing a section taken along the line 6—6 in FIG. 5.
Figure 5:
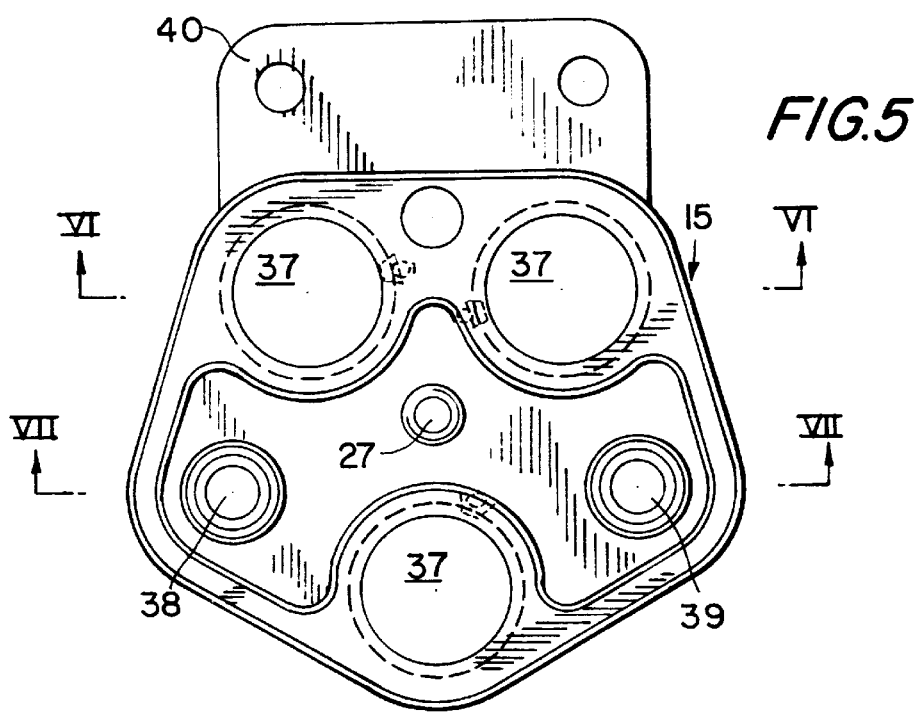
FIG. 5 is an end view of a coupling half which receives the plug socket in accordance with the present invention.

FIGS. 5–7 show the coupling part 15. It has three openings 37 arranged similarly to the coupling part 16 for receiving not shown electrical plug sockets. Moreover, it is provided with two hydraulic connections 38 and 39 which are connected with connections 35 and 31 to provide a flow. The coupling part 15 also has a screw flange 40 so that it can be fixed on the console 25. The coupling part 15 is cup-shaped. FIG. 6 shows the arrangement of the plug socket 41 inside the coupling part 15. The contact bushings can be clearly seen in this drawing. The plug socket 41 is sealed at the side which faces away from the coupling part 16. FIG. 7 shows the arrangement of the plug socket 42 for the supply conduit 18 and for the return conduit 19. At the side facing away from the coupling half 16, it is provided with conventional connectors for connecting the conduits leading to the proportional valves 13. As can be seen from FIGS. 3–7, the outer contour of the disk 25 corresponds to the outer contour of the coupling half 15, with the exception of the screw flange 40. Since each coupling half 15 and 16 has five plugs or plug sockets, a compact structure is provided with a five-cornered contour having rounded corners.

Figure 8:
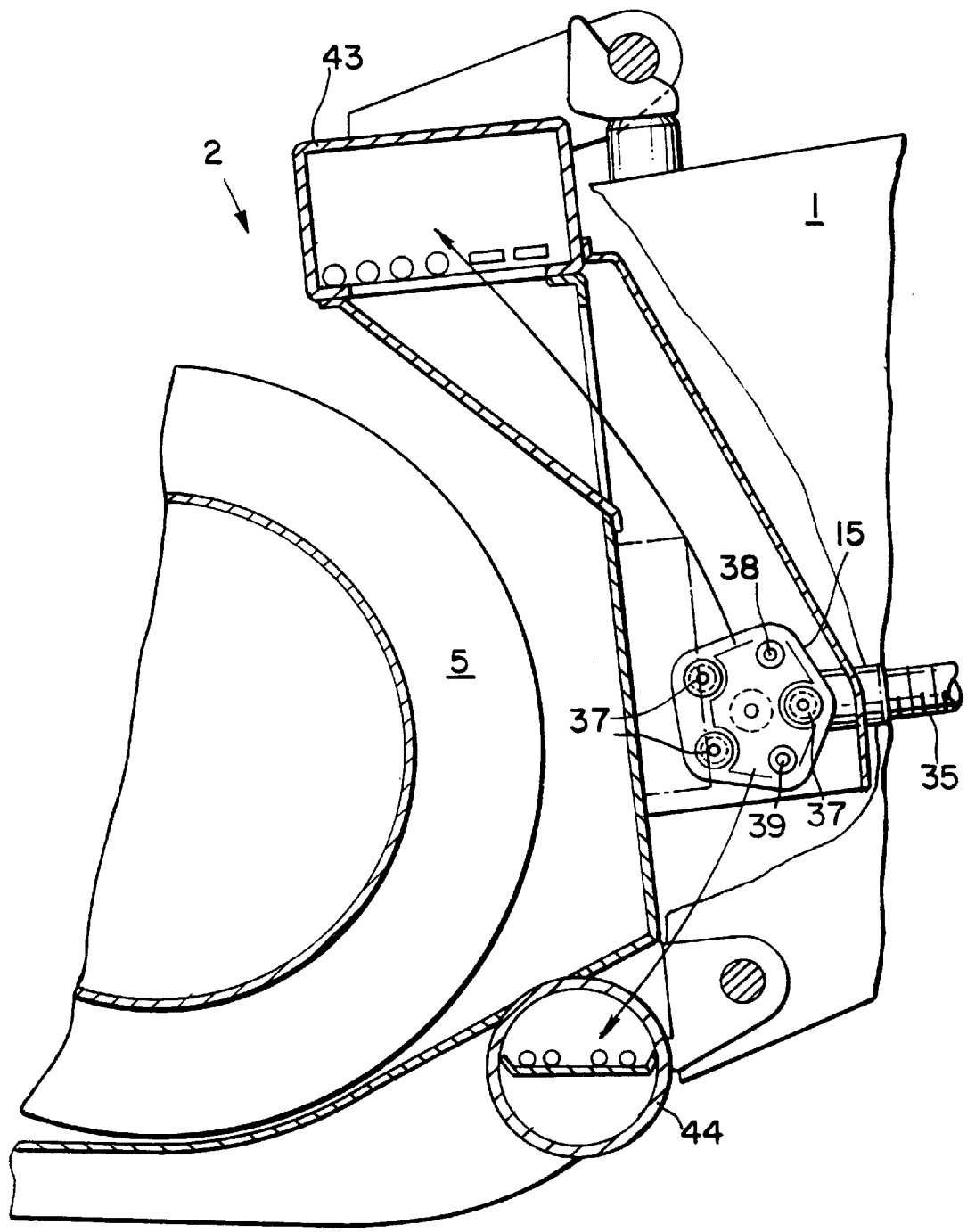
FIG. 8 is a view showing a section taking along the line 8—8 in FIG. 2.

As can be seen from FIG. 8, the drilled and hose conduits as well as the cables extending from the coupling half 15 are located in a protected manner in hollow profiled members 43 and 44. It can be also seen from the drawings that for removing the attachment device 2, the separation of both coupling halves 15 and 16 must be performed. After uncoupling of the attachment device 2, the coupling half 16 can be suspended from the main machine. After the coupling of the same or a different attachment device 2, both coupling halves 15 and 16 must be plugged in one another. Because of the cornered design and the eccentric arrangement of the centering pin 29, the connections cannot be exchanged. A connection of the region of the separating point 6 in the inventive harvester is a multi-connection with the advantage that no components can be lost. The electrical part of the harvester can operate through a microprocessor which is connectable to a CAN-Bus-Network. Such systems are known in the control technology.

It will be understood that each of the elements described above, or two or more together, may also find a useful application in other types of constructions differing from the types described above.

While the invention has been illustrated and described as embodied in agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An agricultural machine, comprising a main machine; an additional device coupled with said main machine; hydraulic means performing control or working functions and including hydraulic valves and hydraulic supply and return conduits; control current means for controlling said hydraulic valves and provided with electrical conductors; single plug means conductively connecting said hydraulic conduits and said electrical conductors in a region of a separating point between said additional device and said main machine, said single plug means including a plug and a plug socket; and single two-part coupling means formed so that in a region of the separating point between said plug and said plug socket, said hydraulic supply and return conduits and said electrical control conductors are arranged in said coupling means in positions corresponding to one another, said single coupling means including one coupling half associated with said main machine and another coupling half associated with said additional device.

2. An agricultural machine as defined in claim 1, wherein said additional device is an attachment device.

3. An agricultural machine as defined in claim 1, wherein said additional device is a working device.

4. An agricultural machine as defined in claim 1, wherein said coupling halves include a coupling half which receives said plug and is provided with two connections for said hydraulic supply and return conduit and with three plugs for said electrical conductors.

5. An agricultural machine as defined in claim 1, wherein said plug and said plug socket are a single plug and a single plug socket of said single plug means, said one coupling half and said another coupling half are a single one coupling half and a single another coupling half of said single coupling means.

6. An agricultural machine, comprising a main machine; an additional device coupled with said main machine; hydraulic means performing control or working functions and including hydraulic valves and hydraulic supply and return conduits; control current means for controlling said hydraulic valves and provided with electrical conductors; plug means conductively connecting said hydraulic conduits and said electrical conductors in a region of separating point between said additional device and said main machine, said plug means including a plug and a plug socket; and two-part coupling means formed so that in a region of the separating point between said plug and said plug socket, said hydraulic supply and return conduits and said electrical control conductors are arranged in said coupling means in positions corresponding to one another, said coupling means including one coupling half associated with said main machine and another coupling half associated with said additional device, said additional device having a rear wall which faces said main machine and is provided with a throughgoing opening for at least one of said hydraulic supply and return conduits and said electrical control conductors, said control current means including an electromagnet, said electromagnet and said hydraulic valves forming a control unit mounted near said throughgoing opening.

7. An agricultural machine as defined in claim 6, wherein said main machine has a connecting aggregate, said additional device having a rear wall, said throughgoing opening being arranged near said connecting aggregate of said main machine in said rear wall of said additional device.

8. An agricultural machine as defined in claim 6, wherein said control unit including said hydraulic valves and said electromagnet is arranged in a region of said additional device which is associated with said throughgoing opening.

9. An agricultural machine, comprising a main machine; an additional device coupled with said main machine; hydraulic means performing control or working functions and including hydraulic valves and hydraulic supply and return conduits; control current means for controlling said hydraulic valves and provided with electrical conductors; plug means conductively connecting said hydraulic conduits and said electrical conductors in a region of separating point between said additional device and said main machine, said plug means including a plug and a plug socket; and two-part coupling means formed so that in a region of the separating point said plug and said plug socket, said hydraulic supply and return conduits and said electrical control conductors are arranged in said coupling means in positions corresponding to one another, said coupling means including one coupling half associated with said main machine and another coupling half associated with said additional device, said coupling halves include a first coupling half provided with said plug socket and formed cup-shaped, and a second coupling half provided with said plug and formed disk-shaped.

10. An agricultural machine as defined in claim 9, and further comprising a sealing body which seals said disk-shaped coupling half from outside.

11. An agricultural machine, comprising a main machine; an additional device coupled with said main machine; hydraulic means performing control or working functions and including hydraulic valves and hydraulic supply and return conduits; control current means for controlling said hydraulic valves and provided with electrical conductors; plug means conductively connecting said hydraulic conduits and said electrical conductors in a region of separating point between said additional device and said main machine, said plug means including a plug and a plug socket; and two-part coupling means formed so that in a region of the separating point between said plug and said plug socket, said hydraulic supply and return conduits and said electrical control conductors are arranged in said coupling means in positions corresponding to one another, said coupling means including one coupling half associated with said main machine and another coupling half associated with said additional device, said current control means including an electromagnet, said additional device having a rear wall which is provided with a console at a rear side facing said main machine, said hydraulic valves, said electromagnet and said coupling halves of said coupling means being supported on said console.

12. An agricultural machine, comprising a main machine; an additional device coupled with said main machine; hydraulic means performing control or working functions and including hydraulic valves and hydraulic supply and return conduits; control current means for controlling said hydraulic valves and provided with electrical conductors; plug means conductively connecting said hydraulic conduits and said electrical conductors in a region of separating point between said additional device and said main machine, said plug means including a plug and a plug socket; and two-part coupling means formed so that in a region of the separating point between said plug and said plug socket, said hydraulic supply and return conduits and said electrical control conductors are arranged in said coupling means in positions corresponding to one another, said coupling means including one coupling half associated with said main machine and another coupling half associated with said additional device, said coupling halves including a second coupling half which receives said plug socket and is associated with said additional device and also has a central threaded pin, and a first coupling half; and further comprising a head nut which is screwable on said threaded pin for providing a fixed and releasable connection of said first coupling half with said second coupling half.

13. An agricultural machine, comprising a main machine; an additional device coupled with said main machine; hydraulic means performing control or working functions and including hydraulic valves and hydraulic supply and return conduits; control current means for controlling said hydraulic valves and provided with electrical conductors; plug means conductively connecting said hydraulic conduits and said electrical conductors in a region of separating point between said additional device and said main machine, said plug means including a plug and a plug socket; and two-part coupling means formed so that in a region of the separating point between said plug and said plug socket, said hydraulic supply and return conduits and said electrical control conductors are arranged in said coupling means in positions corresponding to one another, said coupling means including one coupling half associated with said main machine and another coupling half associated with said additional device, said coupling halves including a first coupling half which receives said plug and is provided with a sleeve engaging with a threaded pin, and a second coupling half provided with an opening in which a centering pin is received.

14. An agricultural machine, comprising a main machine; an additional device coupled with said main machine; hydraulic means performing control or working functions and including hydraulic valves and hydraulic supply and return conduits; control current means for controlling said hydraulic valves and provided with electrical conductors; plug means conductively connecting said hydraulic conduits and said electrical conductors in a region of separating point between said additional device and said main machine, said plug means including a plug and a plug socket; and two-part coupling means formed so that in a region of the separating point between said plug and said plug socket, said hydraulic supply and return conduits and said electrical control conductors are arranged in said coupling means in positions corresponding to one another, said coupling means including one coupling half associated with said main machine and another coupling half associated with said additional device, said coupling halves including a coupling half which receives said plug socket and is cup-shaped.

* * * * *